United States Patent [19]

Kobayashi et al.

[11] Patent Number: 5,658,668

[45] Date of Patent: Aug. 19, 1997

[54] ELECTROMAGNETIC STEEL SHEET AND A CORE MADE THEREFROM

[75] Inventors: Hideo Kobayashi; Norio Kosuge, both of Tokyo; Yuka Komori, Okayama, all of Japan

[73] Assignee: Kawasaki Steel Corporation, Japan

[21] Appl. No.: 412,063

[22] Filed: Mar. 28, 1995

[30] Foreign Application Priority Data

Mar. 31, 1994 [JP] Japan ..................... 6-064154

[51] Int. Cl.$^6$ .................. B32B 15/08; B32B 15/18; H01F 3/02
[52] U.S. Cl. .................. 428/418; 428/457; 148/306; 336/219
[58] Field of Search .................. 428/611, 416, 428/418, 457, 458; 336/219; 148/306

[56] References Cited

U.S. PATENT DOCUMENTS

| | | | |
|---|---|---|---|
| 3,908,066 | 9/1975 | Parkinson | 428/461 |
| 3,924,022 | 12/1975 | Schroeter et al. | 336/219 |
| 4,032,673 | 6/1977 | Schroeter et al. | 336/219 |
| 4,830,877 | 5/1989 | Katayama et al. | 148/245 |
| 4,844,753 | 7/1989 | Katayama et al. | 148/113 |
| 5,242,760 | 9/1993 | Matsuoka et al. | 336/219 |

*Primary Examiner*—John Zimmerman
*Attorney, Agent, or Firm*—Austin R. Miller

[57] ABSTRACT

An electromagnetic steel sheet having a corrosion-resistant electrically insulating film. The insulating film is formed by spraying and baking, on the steel sheet, a treating liquid containing an emulsion of fine resin particles, a reducing agent and an accelerator. The emulsion of fine resin particles exhibits a weight change peak temperature of not lower than about 400° C. as measured by differential thermal weight measurement conducted while raising the emulsion temperature at a constant rate of temperature rise. The emulsion also substantially resists when contacted by phosphoric acid. The reducing agent is a phosphate ion aqueous solution containing a metal. Also disclosed is a corrosion-resistant core made from the electromagnetic steel sheet.

20 Claims, No Drawings

ELECTROMAGNETIC STEEL SHEET AND A CORE MADE THEREFROM

BACKGROUND OF THE INVENTION

Field of the Invention

The invention relates to an electromagnetic steel sheet having an electrically insulating film which excels in corrosion resistance and, more particularly, to an electromagnetic steel sheet having an electrically insulating film of phosphate-organic resin type.

Insulating films on electromagnetic steel sheets are required to meet various requirements such as electrical insulation, closeness of adhesion, punchability, weldability, corrosion resistance, and so forth. Studies have been made to satisfy these requirements, and many methods for forming insulating film on the surface of the electromagnetic steel sheet, as well as insulating film compositions, have been proposed.

Japanese Patent Laid-Open No. 50-103438 discloses a method for forming such an insulating film composition of the type which is prepared by compounding an organic resin into a treating solution, wherein the insulating film is formed by using a treating liquid which is prepared by compounding 0.1 to 50 weight parts of an acid-soluble organic resin such as polyvinylalcohol, polyacrylic acid or acrylester emulsion to 10 weight parts of phosphoric acid ion.

Meanwhile, Japanese Patent Laid-Open No. 60-169567 discloses a method in which an insulating film is formed by compounding an acrylic resin, ethylene-vinylacetate copolymer or a thermosetting epoxy resin emulsion to a treating liquid containing phosphate.

Both of these methods utilize treating liquids which are prepared by compounding organic resins to a solution mainly composed of phosphate. These methods require baking at temperatures exceeding 300° C. Consequently, the resin thermally decomposes during the firing, resulting in inferior coating film performance in terms of corrosion resistance and punchability, as well as insufficient shelving stability of the above-mentioned emulsion in the phosphate type aqueous solution.

More specifically, the resins used in Japanese Patent Laid-Open Nos. 50-103438 and 60-169567 are selected primarily for their dissolution or dispersion properties in the treating liquid, while the heat resistance of the resin is ignored. Consequently, the electromagnetic sheets exhibit inferior corrosion resistance.

We have proposed, in Japanese Patent Laid-Open No. 6-235070, an electromagnetic steel sheet which excels both in weldability and punchability, as well as in corrosion resistance. This electromagnetic steel sheet is produced by using a resin primarily composed of a chromate and having a thermal decomposition peak temperature of 400° C. or higher. More specifically, in this method, emulsion resin particles have a two-layered structure composed of an outer layer constituted by a resin having high resistance to chromic acid and a thermal decomposition peak temperature of about 400° C. or higher, and an inner layer constituted by a resin which is crosslinkable so as to enhance heat resistance and which has a thermal decomposition peak temperature of about 400° C. or higher, thus improving stability and heat resistance of the coating solution.

In recent years, however, a trend toward automated production of cores such as motor cores has given rise to a demand for greater slipperiness of the steel before and after strain relieving annealing. The term "slipperiness" is used herein to describe a characteristic of the steel that enables the steel to smoothly slip onto a guide or other steel sheet. This characteristic enables smooth transportation of steel sheets, as well as smooth lamination of steel sheets punched in the form of motor cores.

A steel coated with a resin containing chromate as the principal component exhibits inferior slipperiness. Further, there is a current demand for chromium-free materials in order to prevent environmental pollution. The method disclosed in Japanese Patent Laid-Open No. 6-235070 inevitably increases running costs due to the expense associated with disposal of waste liquids, the preservation of a good working environment, and so forth. The use of chromate as the primary component of the insulating film composition is therefore not recommended.

SUMMARY OF THE INVENTION

Accordingly, an object of the present invention is to provide an electromagnetic steel sheet having an insulating film not containing chromate as the primary component, and to improve corrosion resistance of such an electromagnetic steel sheet.

Improved corrosion resistance can be obtained by using a thermosetting resin which has a crosslinkable structure and which undergoes thermal decomposition only at a high temperature. However, most thermosetting resins exhibit inferior dissolution or dispersion in many media, and the resulting gelation impairs the stability of the coating solution. Therefore, another object of the invention is to overcome this problem.

We studied the relationship between corrosion resistance and coating structure and discovered that corrosion resistance tends to be reduced by secondary cohesion of the resin forming the coating film.

It is therefore another object of the invention to prevent secondary cohesion of the resin when the resin is formed into a coating film for an electromagnetic steel sheet.

In endeavoring to solve these problems, we discovered a remarkable thermosetting resin containing a phosphate, and which does not exhibit gelation even when compounded into a phosphate type agent. We also discovered that an insulating film formed by applying a treating solution of the resin together with phosphate exhibits remarkably improved corrosion resistance. The invention is based upon these discoveries.

According to one aspect of the invention, there is provided an electromagnetic steel sheet having a corrosion-resistant electrically insulating film formed thereon, a treating liquid containing an emulsion of fine resin particles, a reducing agent and an accelerator. The emulsion of fine resin particles possesses a weight change peak temperature of not lower than about 400° C., as measured by differential thermal weight measurement conducted while raising the emulsion temperature at a constant rate, as well as substantial resistance to gelling when contacted by phosphoric acid. The reducing agent is a phosphate ion aqueous solution containing a metal.

The invention also provides an electromagnetic steel sheet having a corrosion-resistant electrically insulating film formed thereon, a treating liquid containing an emulsion of fine resin particles, a reducing agent and an accelerator. The emulsion of fine resin particles possesses a weight change peak temperature of not lower than about 400° C., as measured by differential thermal weight measurement conducted while raising the emulsion temperature at a constant rate. The emulsion also has substantial resistance to gelling when contacted by phosphoric acid and contains crosslinkable thermosetting resin. The reducing agent is a phosphate ion aqueous solution containing a metal.

The invention also provides an electromagnetic steel sheet having a corrosion-resistant electrically insulating film formed thereon, a treating liquid containing an emulsion of fine resin particles, a reducing agent and an accelerator. The emulsion of fine resin particles possesses a weight change peak temperature of not lower than about 400° C., as measured by differential thermal weight measurement conducted while raising the emulsion temperature at a constant rate. The emulsion also has substantial resistance to gelling when contacted by phosphoric acid and contains crosslinkable thermosetting resin having an outer resin layer resistant to phosphoric acid. The reducing agent is a phosphate ion aqueous solution containing a metal.

The invention further provides an electromagnetic steel sheet having a corrosion-resistant electrically insulating film formed thereon, a treating liquid containing an emulsion of fine resin particles, a reducing agent and an accelerator. The emulsion of fine resin particles exhibits a weight change peak temperature of not lower than about 400° C., as measured by differential thermal weight measurement conducted while raising the emulsion temperature at a constant rate. The emulsion also has substantial resistance to gelling when contacted by phosphoric acid and contains crosslinkable thermosetting resin having an outer resin layer resistant to phosphoric acid. The thermosetting resin also has a nitrogen atom in its principal skeleton. The reducing agent is a phosphate ion aqueous solution containing a metal.

Preferably, the amount of electrically insulating film deposited on the steel sheet ranges from about 0.2 to 4.0 g/m$_2$.

In another aspect of the invention, a core of a motor or a transformer is provided, formed by laminating core sheets punched from the electromagnetic steel sheet of any of the foregoing types of electromagnetic steel sheets.

DETAILED DESCRIPTION OF THE INVENTION

The treating liquid in accordance with the invention contains the following components:

(a) an aqueous emulsion of fine resin particles, (b) a phosphate-type aqueous solution containing at least one kind of bivalent metal, and (c) an accelerator.

The proportion between the component (a) and the component (b) is preferably such that solid resin content in the emulsion is from about 5 to 300 weight parts per 100 weight parts of phosphate agent calculated on an $H_3PO_4$ basis. Appreciable improvement in the corrosion resistance of the insulating film is attained when the solid resin content in the emulsion ranges from about 5 to 120 weight parts, preferably from about 20 to 80 weight parts. To improve oil-less punchability, i.e., punching conducted without the aid of punching oil, the solid resin content in the emulsion should range from about 120 to 300 weight parts, preferably from about 120 to 200 weight parts. The content of component (c) preferably ranges from about 1 to 20 weight parts, more preferably from about 2 to 10 weight parts, of the phosphate ion agent calculated on an $H_3PO_4$ basis.

The resin which constitutes the fine particles in the aqueous emulsion represents a critical feature of the invention. More specifically, the resin of the invention should exhibit a weight change peak temperature, i.e., the temperature at which the resin weight change peaks when heated at a constant rate in differential thermal weight measurement (DTG), that is about 400° C. or higher, preferably about 410° C. or higher. The resin also should be resistant to phosphoric acid.

The weight change peak temperature in the differential thermal weight measurement (DTG) is determined as follows. A sample or specimen is heated in an inert atmosphere to increase the temperature at a constant rate, e.g., 20° C. per minute, and the weight reduction of the specimen is measured repeatedly as the temperature increases. The temperature at which the weight changing rate dG/dt (G being weight of the specimen, t being time) is maximized represents the weight change peak temperature. Thermal weight measurement (TG), differential thermal weight measurement (DTG) and differential thermal analysis (DTA) are known methods of measuring thermo-chemical behavior of a substance. By using the weight change peak temperature as a parameter, it is possible to evaluate the thermo-chemical performance of the resin used in the invention. The weight change peak temperature can be measured by using an apparatus which simultaneously measures both differential heat and thermal weight. Such a device is commercially available from Kabushiki Kaisha Daini Seikosha under the tradename of Model SSC/560 GH. In the measurement, about 10 mg of specimen is heated from 30° C. up to 550° C. at a temperature rising rate of 20° C./min. The weight change peak temperature is read from a DTG curve drawn by plotting the results of the measurement.

Although a variety of resin types may be used in the invention, it is preferred that the resin is a thermosetting resin capable of forming crosslinked structure, which also possesses high resistance to phosphoric acid.

The resin may consist of homogeneous fine particles or fine particles having a layered structure with a plurality of layers.

When particles having a layered structure are used, at least one of the layers should be formed from a resin having a weight change peak temperature of about 400° C. or higher when heated so as to increase the temperature at a constant rate, while at least one of other layers is formed from a resin resistant to phosphoric acid.

Thermal decomposition of the resin can be controlled by generating crosslinked structure in the fine particle. Such control can be effected when a thermosetting resin is used. In general, however, crosslinkable thermosetting resin contains, before crosslinking, many functional groups such as hydroxyl groups, epoxy groups and so forth, which promote gelation by phosphoric acid. This problem can be overcome by forming a phosphoric acid-resistant resin layer on the surface exposed to the acid.

Thus, the fine resin particles preferably have a layered structure with an inner layer (core) formed of a crosslinkable thermosetting resin and an outer layer (shell) made of a resin resistant to phosphoric acid.

Examples of the thermosetting resin suitably used as the material of the inner layer (core) are: phenol resins (phenol.formaldehyde resin, xylenol.formaldehyde resin, cresol.formaldehyde resin, resorcin.formaldehyde resin, and so forth), epoxy resins (bisphenol epoxy resin, alicyclic epoxy resin, novolak epoxy resin, aliphatic epoxy resin, epoxylated urethane resin, and so forth), furfural resins, urethane resins, unsaturated polyester resins, amino resins, polyimide resins, polyamideimide resins, and so on. Other crosslinkable resins also may be used.

Among the epoxy resins as the material of the inner layer (core), a glycidylamine type epoxy resin which has nitrogen atoms in the main skeleton of the resin is particularly suitable, since this type of epoxy resin exhibits markedly high resistance to thermal decomposition.

Skeletons of typical examples of this type of resin are shown below, among which tetraglycidyl diaminodiphenylmethane (abbreviated as TGDDM) is most suitable.

An epoxy resin having nitrogen atoms as an essential element in the main skeleton may be used alone, although formation of the insulating film is facilitated when this type of resin is used in combination with a bisphenol type epoxy resin.

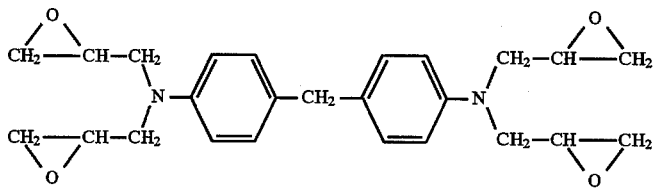
NAME: TGDDM (EPICOAT 604: Produced by Yuka Shell Epoxy)

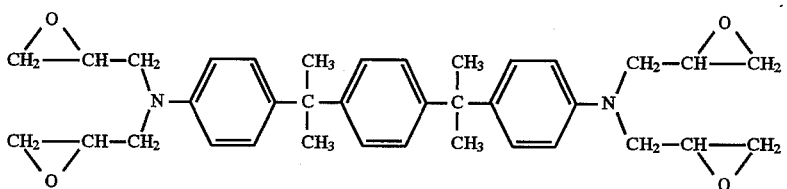
NAME: HPT 1071 (Produced by Shell Chemical (USA))

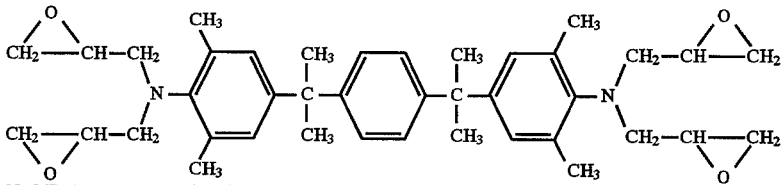
NAME: HPT 1072 (Produced by Shell Chemical (USA))

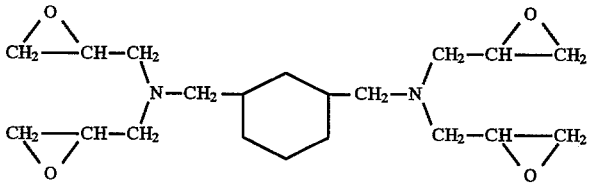
NAME: TETRAD-D (Produced by Mitsubishi Gas Kagaku)

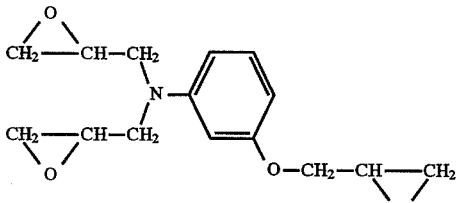
Name: m-aminophenol type epoxy resin (ELNM-120: produced by Sumitomo Kagaku Kogyo)

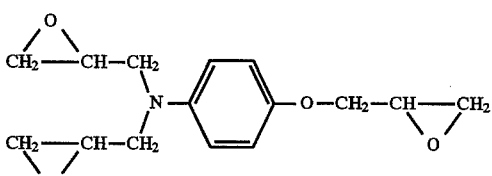
Name: p-aminophenol Epoxy Resin (produced by Yuka Shell Epoxy)

Other examples of epoxy resins containing nitrogen atoms in the main skeleton include bisphenol-type epoxy resins and resins represented by, for example, the following chemical formula with aromatic amines with good heat resistance (e.g. diaminodiphenylmethane) partly added:

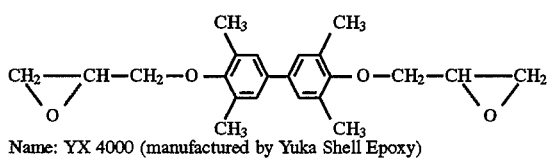

Name: YX 4000 (manufactured by Yuka Shell Epoxy)

Further, it is necessary to integrate the phosphoric acid resistant resin coating, formed on the outer side of the core, with the thermosetting resin forming the core section to produce an emulsion. This is achieved by using a resin formed from an ethylenic unsaturated carboxylic acid and a monomer copolymerizable therewith.

Usable ethylenic unsaturated carboxylic acids include ethylenic unsaturated monobasic carboxylic acids such as acrylic acid, methacrylic acid, and crotonic acid; and ethylenic unsaturated dibasic carboxylic acids such as itaconic acid, maleic acid, and fumaric acid. Examples of ethylenic unsaturated monomers include alkyl acrylates or methacrylates such as (metha) methyl acrylate, (metha) ethyl acrylate, (metha) n-butyl acrylate, (metha) isobutyl acrylate, and (metha) 2-ethylhexyl acrylate; and other monomers having an ethylenic unsaturated bond copolymerizable therewith such as styrene, α-methylstyrene, vinyl toluene, t-butyl styrene, ethylene, propylene, vinyl acetate, vinyl chloride, vinyl propionate, acrylonitrile, methacrylonitrile, (metha) dimethylaminoethyl acrylate, vinyl pyridine, and acrylamide. Two or more types of these monomers may be used in combination.

Although preferable methods of producing a core-shell type water emulsion of fine resin particles used in the present invention are disclosed in, for example, Japanese Patent Laid-Open No. 64-4662, and Japanese Patent Publication No. 2-12964, a detailed description will be given below of the method of producing the emulsion.

Emulsion polymerization, which is carried out in multiple stages, comprises a first stage in which a core section resin particle is formed, and a second stage in which a shell copolymer is coated onto the surface of the resin particle core which has been formed.

In the first stage of emulsion polymerization, a core is formed. More specifically, a fine core particle is readily obtained by dissolving a thermosetting resin, insoluble in water, in ethylenic unsaturated monomer suitable for emulsion polymerization and subsequently performing emulsion polymerization by a well-known method. It may also be obtained by adding a thermosetting resin, insoluble in water, to a water phase including an emulsifier and dispersed therein, followed by emulsion polymerization conducted while adding an ethylenic unsaturated monomer to the resultant dispersion. Suitable thermosetting resins, insoluble in water, may be selected from the group consisting of commercially available phenol resin, epoxy resin, furfural resin, urethane resin, unsaturated polyester resin, amino resin, polyimide resin, and polyamide imide resin which are insoluble or not readily soluble in water. In addition, the aforementioned epoxy resins with high heat resistance may be used.

In the second stage of emulsion polymerization, a shell section to be coated onto the aforementioned core section is formed. To form the resin particle having a two-layer structure, little or no emulsifier is added so as to prevent the formation of a new resin particle and to allow polymerization substantially to progress from the surface of the resin particle formed in the first stage. Since the shell section formed in the second stage must be hydrophilic, it is preferable to use ethylenic unsaturated monomers containing an amino group such as N-methylaminoethylacrylate or methacrylate; monopyridines such as vinyl pyridine; vinyl ethers containing an alkyl amino group such as dimethylaminoethylvinyl ether; and unsaturated amides containing an alkylamino group such as N-(2-dimethylaminoethyl) acrylamide or methacrylic amide. Although these ethylenic unsaturated monomers containing an amino group may form a homopolymer, they can also be used to form a copolymer with another ethylenic unsaturated monomer.

In the second stage of emulsion polymerization, ethylenic unsaturated carboxylic acid may constitute a portion of the ethylenic unsaturated monomer.

More specifically, suitable ethylenic unsaturated carboxylic acids include ethylenic unsaturated monobasic carboxylic acids such as acrylic acid, methacrylic acid, and crotonic acid; and ethylenic unsaturated dibasic carboxylic acids such as itaconic acid, maleic acid, and fumaric acid. These carboxylic acids may be used singly or in a combination of two or more types.

The emulsion polymer obtained in the aforementioned first stage is added to a water phase, followed by addition of an ethylenic unsaturated monomer mixture and radical generating initiator to produce a water emulsion of fine resin particle by a conventional emulsion polymerization method. During this process, an emulsion may be added to prevent generation of condensates or to stabilize the polymerization reaction. Emulsifiers which may be used in the present, invention include anionic emulsifiers such as alkyl benzene sulfonate soda, nonionic emulsifiers such as polyoxyethylene alkyl ether, and other emulsifiers typically used for emulsion polymerization.

Examples of radical generating initiators used in the emulsion polymerization include potassium persulfate, ammonium persulfate, and azobisisobutyronitrile. The concentration may be, in general, such that the solid concentration of the resin in the final water emulsion becomes about 25 to 65 percent by weight. The temperature range at which emulsion polymerization is conventionally performed may be used. Emulsion polymerization is usually carried out at atmospheric pressure.

It is preferable that the thermosetting resin forming the core and resin forming the phosphoric acid-resistant shell are mixed in a ratio of about 100 parts by weight to about 20 to 100 parts by weight, respectively. More specifically, when concentration of phosphoric acid resistant resin is about 20 parts by weight or less, it is impossible to completely coat the thermosetting resin forming the core section, thereby allowing gelation to occur when phosphoric acid chemicals are added. On the other hand, when the phosphoric acid-resistant shell constitutes more than about 100 parts by weight, it cannot be made more resistant to thermal decomposition.

A phosphate preferably containing at least one metal is used as component (b) in the treating liquid of the invention.

Phosphates which may be used include, for example, phosphate salts such as salts of sodium, potassium, magnesium, calcium, manganese, molybdenum, zinc, and aluminum.

Substances to be dissolved include metal oxides such as MgO, CaO, ZnO, and $Al_2O_3$; hydroxides such as $Mg(OH)_2$, $Ca(OH)_2$, $Zn(OH)_2$, and $Al(OH)_3$; and carbonates such as $MgCO_3$, $CaCO_3$, and $ZnCO_3$.

These substances are dissolved in an aqueous phosphoric acid solution to form a desired aqueous phosphate solution.

An accelerating agent for deactivating the coating film may be used as component (C) in the treating liquid. Usable accelerating agents include sodium alkylbenzene sulfonic acid, polyoxyethylene, polyoxypropylene block polymer, polyoxyethylene phenol ether, aluminum acetate, acetic acid, heteromolybdic acid, and potassium permanganate, and metallic oxide agents.

The quantity of these substances added is preferably in the range of from about 1 to 20 parts by weight to about 100 parts by weight of $H_3PO_4$, but is not particularly limited thereto.

When the initiator concentration is less than about 1 part by weight, baking may reduce the water resistance when a phosphate having a high dehydration temperature is used.

On the other hand, a concentration of more than about 20 parts by weight causes gelation in the treating liquid during treatment.

Boric acid, chromate, or the like may be mixed to further increase the heat resistance of the coating, while colloidal substances such as colloidal silica or inorganic fine particles such as powdered silica may be mixed to increase the resistance between layers after stress relief annealing.

An electromagnetic steel sheet of the invention is produced in the following manner.

The treating liquid having the aforementioned composition is coated uniformly and continuously on the surface of an electromagnetic steel sheet by means of, for example, a roll coater, and baked and hardened for a short time in a drying furnace at a temperature of from about 300° to 700° C. to form the electrically resistant coating film. In this process, the coating weight of the film after baking is about 0.2 to 4 $g/m^2$, but preferably about 0.3 to 3 $g/m^2$. A coating weight of less than about 0.2 $g/m^2$ causes reduction in insulation film coating rate, punchability and corrosion resistance. On the other hand, a coating weight exceeding about 4 $g/m^2$ tends to compromise the adhesion of the insulation film.

The thus obtained insulation film was found not only to have excellent corrosion resistance, but also to have satisfactory adhesiveness, electrical resistance, weldability, heat resistance, resistance to chemicals, slidability and punchability.

The invention will now be described through specific Examples. The Examples are intended to be illustrative but are not intended to limit the scope of the invention defined in the appended claims.

Resin emulsion (E1) was produced from the following materials and method. The following materials were introduced into and dissolved an a 1.5 L reaction container provided with a stirrer, reflux condenser, dropping funnel, and thermometer:

Deionized water 3240 parts

EMULGEN 931 (Polyoxyethylene nonylphenyl ether) (Kao Corp.: Nonionic emulsifier) 10 parts NEOGEN R (Sodium alkylbenzene sulfonate) (Dai-ichi Kogyo Seiyaku Co., Ltd.: Anionic emulsifier) 4.0 parts.

A mixture of the following was introduced into the dropping funnel in the first stage of emulsion polymerization:

EPICOAT 604 (Diaminodiphehylmethane) (produced by Yuka Shell Epoxy Co., Ltd.) 60 parts Bisphenol A epoxy resin 40 parts Butyl acrylate 200 parts Methyl methacrylate 100 parts Acrylic acid 8.0 parts.

While introducing nitrogen gas and stirring, the temperature in the reaction device was increased to 60° C., followed by addition of 40 parts of aqueous potassium persulfate solution dissolved in deionized water at a 2% concentration.

Then, there was added 20% of a monomer mixture of epoxy resin, butyl acrylate, methyl methacrylate, and acrylic acid, which had been introduced into the dropping funnel. With the rise in internal temperature due to polymerization heat controlled to 80° C. by a water bath, the remaining epoxy resin/monomer mixture and 80 parts of a 2% aqueous potassium persulfate solution was added dropwise for 2 hours to carry out polymerization. After maintaining the mixture at a temperature of 80° C. for 2 hours, the mixture was cooled to room temperature and filtered through a 200 mesh filter cloth to extract seed particles of emulsified polymers. The collected polymers had a nonvolatile concentration of 50.3 wt%, and a pH of 2.8.

In the same way, 452 parts of the thus obtained emulsion polymer and 125 parts of water were introduced into the 1.5 L reaction device. In the second emulsion polymerization state, the following ethylenic unsaturated monomers were introduced into the dropping funnel under control:

Ethyl acrylate 60 parts

Methyl methacrylate 30 parts

Dimethylaminoethylmethacrylate 2.0 parts

Acrylic acid 1.0 parts.

With nitrogen gas introduced and with stirring, the temperature in the reaction device was increased to 70° C., and 60 parts of a 2% potassium persulfate solution and a mixture liquid of the aforementioned monomers were added dropwise in a separate dropping funnel for polymerization. This dropwise addition was carried out for 2 hours with the temperature maintained at 70° C. After this mixture was maintained at this temperature for 2 hours, it was cooled to room temperature and filtered through a 200 mesh filter cloth to obtain a polymer emulsion used in the present invention. The thus obtained polymer emulsion had a solid resin concentration of 48 wt%.

Resin emulsion (E2) was produced using the following materials.

In the first stage, a mixture of the following substances were used:

EPICOAT 604 (produced by Yuka Shell Epoxy Co., Ltd.) 70 parts

Biphenol A epoxy resin 30 parts

Ethyl acrylate 300 parts

Methyl methacrylate 100 parts

Methacrylic acid 8.0 parts.

In the second stage, a mixture of the following substances were used:

Ethyl acrylate 50 parts

Methyl methacrylate 30 parts

Methacrylic acid 2.0 parts

Butyl acrylate 2.0 parts.

The resin emulsion was produced in the same way as E1. The thus obtained emulsion had a resin solid concentration of 52 wt%.

Resin emulsion (E3) was produced using the following materials.

The same substances were used, except that a mixture of the following substances were used in the first stage:

TETRAD-D (Mitsubishi Gas Kagaku) 100 parts

Ethyl acrylate 200 parts

Methyl methacrylate 100 parts

Methacrylic acid 8.0 parts.

The emulsion (E3) was produced in the same way as E1.

Resin emulsion (E4) was produced using the following materials.

In the second stage, a mixture of the following substances were used:

Ethyl acrylate 50 parts

Methyl methacrylate 30 parts

Vinyl pyridine 1.0 part

Acrylic acid 1.0 part.

The emulsion (E4) was produced in the same way as E1. The thus obtained emulsion had a resin solid concentration of 46 wt%.

Resin emulsion (E5) was produced using the following materials.

In the second stage, a mixture of the following substances was used:

Ethyl acrylate 50 parts

Methyl methacrylate 30 parts

Acrylamide 1.0 part

Acrylic acid 1.0 part.

The emulsion (E5) was produced in the same way as E1. The thus obtained emulsion had a solid resin concentration of 46 wt%.

Treating liquids containing various components as recited in Table 1 were applied singly onto a 0.5 mm thick electromagnetic steel sheets, and then baked in a 450° C. air-heating furnace for 120 seconds to form an insulation film on the aforementioned steel sheets.

During insulation film formation, very good coating workability and enduring stability of the treating liquid was observed in all of the Examples. In addition, uniform coating weight of the films were obtained as shown in Table 2. The various film characteristics were obtained by the measurement method and judgment standard given below. The results are shown in Table 2.

A sheet obtained from the electromagnetic sheet plate having the insulation film with a width of 50 mm, length of 100 mm, and a thickness of 0.5 mm was cut out by a shearing machine so that the rolling direction coincided with the direction of the width. After the sheet was cut out, it was subjected to stress relief annealing in an $N_2$ atmosphere for two hours at 750° C. The sheet was then subjected to a salt spray test for 7 hours, after which the production rate of rust was examined. Thereafter, it was tested for anticorrosion for 20 days in a constant temperature/humidity bath at 50° C. and having 80% RH. The lower the production rate of rust, the better the corrosion resistance.

(1) Resistance between layers

Measured in accordance with JIS C2550.

The larger the resistance between layers, the better the electrical insulation.

(2) Adhesiveness

Before annealing, the diameter (in cm) in which film pealing does not occur at the bent surface was measured.

After annealing, the film was observed for possible tape pealing at the flat surface.

The less pealing occurs, the better the adhesiveness.

(3) Weldability

A sheet having a width of 30 mm, length of 130 mm, and a thickness of 0.5 mm was punched out by a shearing machine such that the rolling direction was in the direction of the width. Then, it was compressed at a compression force of 100 kg/cm². The cross sections of the obtained laminated layer substance were then subjected to TIG welding under the following conditions: Current: 120 A, shield gas; Ar (flow rate: 6 l/min). The maximum welding speed which does not cause the production of blow holes is expressed in cm/min.

(4) Resistance to refrigerant

Left in a mixture of Freon-22 and refrigerator oil in a 9 to 1 mixing ratio for 10 days at a temperature of 80° C. the decrease in weight was measured.

The smaller the decrease in weight, the better the resistance to refrigerant.

(5) Oil resistance

Dipped in insulation oil No. 1 for 72 hours at a temperature of 120° C. the decrease in weight was measured.

The smaller the decrease in weight, the better the oil resistance.

(6) Punchability

Punching was performed in a 15 mm diameter steel die while using punching oil. The number of punches required to reach a burr height of 50 μm was counted.

The greater the number of punches required to reach a burr height of 50 μm, the better the punchability.

(7) Heat resistance

In differential heat weight measurement, the sample was heated every minute at a temperature of 20° C. in an inactive atmosphere, followed by measurement of the decrease in weight of the sample with respect to temperature. Then, the peak temperature with respect to weight change rate dG/dt was obtained. The higher the peak temperature, the higher the resistance to heat.

TABLE 1

|  | Example 1 | Example 2 | Example 3 | Example 4 | Example 5 | Example 6 | Example 7 |
|---|---|---|---|---|---|---|---|
| Kind of Emulsion | E 1 | E 1 | E 1 | E 2 | E 3 | E 4 | E 5 |
| Amount of Emulsion * | 25 Weight Parts | 10 Weight Parts | 80 Weight Parts | 40 Weight Parts | 25 Weight Parts | 30 Weight Parts | 25 Weight Parts |
| Kind and Amount of Phosphate | Monobasic Magnesium Phosphate 100 Weight Parts Calculated on $H_3PO_4$ Basis | Monobasic Calcium Phosphate 100 Weight Parts Calculated on $H_3PO_4$ Basis | Monobasic Aluminum Phosphate 100 Weight Parts Calculated on $H_3PO_4$ Basis | Monobasic Zinc Phosphate 100 Weight Parts Calculated on $H_3PO_4$ Basis | Monobasic Manganese Phosphate 100 Weight Parts Calculated on $H_3PO_4$ Basis Water: 100 Weight Parts | Monobasic Molybdenum Phosphate 100 Weight Parts Calculated on $H_3PO_4$ Basis Water: 100 Weight Parts | Monobasic Magnesium Phosphate 85 Weight Parts Calculated on $H_3PO_4$ Monobasic Aluminum Phosphate 15 Weight Parts Calculated on $H_3PO_4$ Basis |
| Kind and Amount | Sodium Alkylbenzene | Polyoxyethylene Polyoxypropylene | Polyoxyethylene Phenolether | Aluminum Nitrate | Sodium Alkybenzene | Polyoxyethylene Propylene Block | Aluminum Nitrate |

TABLE 1-continued

| | Example 1 | Example 2 | Example 3 | Example 4 | Example 5 | Example 6 | Example 7 |
|---|---|---|---|---|---|---|---|
| Kind and Amount of Accelerator** | Sulfonate 1 Weight Parts | Block Polymer 2 Weight Parts | 6 Weight Parts | 8 Weight Parts | Sulfonate 5 Weight Parts | Polymer 2 Weight Parts | 10 Weight Parts |
| Kind and Amount of Additive*** | Colloidal Silica 15 Weight Parts | Boric Acid 10 Weight Parts | | Colloidal Silica 15 Weight Parts | | Zirconia Sol 15 Weight Parts | Colloidal Silica 15 Weight Parts |

| | Example 8 | Example 9 | Example 10 | Example 11 | Example 12 | Example 13 | Example 14 | Example 15 |
|---|---|---|---|---|---|---|---|---|
| Kind of Emulsion | E 1 | E 2 | E 3 | E 4 | E 5 | E 1 | E 2 | E 3 |
| Amount of Emulsion* | 20 Weight Parts | 10 Weight Parts | 30 Weight Parts | 25 Weight Parts | 40 Weight Parts | 35 Weight Parts | 15 Weight Parts | 50 Weight Parts |
| Kind and Amount of Phosphate | Monobasic Aluminum Phosphate 100 Weight Parts Calculated on $H_3PO_4$ Basis | Monobasic Aluminum Phosphate 100 Weight Parts Calculated on $H_3PO_4$ Basis | Monobasic Manganese Phosphate 100 Weight Parts Calculated on $H_3PO_4$ Basis | Monobasic Magnesium Phosphate 100 Weight Parts Calculated on $H_3PO_4$ Basis | Monobasic Aluminum Phosphate 100 Weight Parts Calculated on $H_3PO_4$ Basis | Monobasic Aluminum Phosphate 100 Weight Parts Calculated on $H_3PO_4$ Basis | Monobasic Calcium Phosphate 100 Weight Parts Calculated on $H_3PO_4$ Basis | Monobasic Aluminum Phosphate 85 Weight Parts Calculated on $H_3PO_4$ Basic |
| Kind and Amount of Accelerator** | Nitric Acid 5 Weight Parts | Phosphormolybdic Acid 10 Weight Parts | Manganese Sulfate 15 Weight Parts | Siliconmolybdic Acid 5 Weight Parts | Silicontungsten Acid 5 Weight Parts | Phosphortungsten Acid 5 Weight Parts | Potassium Permanganate 10 Weight Parts | |
| Kind and Amount of Additive*** | Boric Acid 10 Weight Parts | | Boric Acid 10 Weight Parts | Boric Acid 10 Weight Parts | | | | Colloidal Silica 10 Weight Parts |

*Calculated on resin solid content per 100 weight parts of $H_3PO_4$
**per 100 weight parts of $H_3PO_4$
***Calculated on solid content per 100 weight parts of $H_3PO_4$

TABLE 2

| | Example 1 | Example 2 | Example 3 | Example 4 | Example 5 | Example 6 | Example 7 |
|---|---|---|---|---|---|---|---|
| Coating Liquid Stability | good | good | good | good | good | good | good |
| Amount of Coating Film Deposition (g/m²) | 1.0 | 0.9 | 0.8 | 0.7 | 1.2 | 3.0 | 0.4 |
| Inter-layer Resistance ($\Omega$-cm²/sec) | | | | | | | |
| Before Annealing Bent | 20 | 32 | 23 | 27 | 21 | >200 | 16 |
| After Annealing Flat | 5.9 | 6.4 | 3.8 | 5.1 | 6.2 | 8.7 | 2.8 |
| Adhesion | | | | | | | |
| Before Annealing Bent | 10 | 10 | 10 | 10 | 15 | 20 | 10 |
| After Annealing Flat | no exfoliation | no exfoliation | no exfoliation | no exfoliation | no exfoliation | no exfoliation | no exfoliation |
| Corrosion Resistance Rusting Ratio (%) | <20 | <20 | <20 | <20 | <10 | <5 | <20 |
| Weldability (cm/min) Max. speed with no blow-hole Generation | 60 | 60 | 50 | 60 | 60 | 20 | 120 |
| Punchability (×10⁴ cycles) | >100 | >100 | 100 | >100 | >100 | >100 | 60 |
| Anti-refrigerant (weight change) | almost no change | almost no change | almost no change | almost no change | almost no change | almost no change | almost no change |
| Anti-Oil (weight change) | almost no change | almost no change | almost no change | almost no change | almost no change | almost no change | almost no change |
| Thermal Decomposition Peak Temperature (°C) | 423 | 423 | 423 | 438 | 416 | 412 | 420 |

| | Example 8 | Example 9 | Example 10 | Example 11 | Example 12 | Example 13 | Example 14 | Example 15 |
|---|---|---|---|---|---|---|---|---|
| Coating Liquid Stability | E 1 | E 2 | E 3 | E 4 | E 5 | E 1 | E 2 | E 3 |
| Amount of Coating Film Deposition (g/m²) | 1.0 | 0.7 | 1.2 | 2.0 | 0.5 | 0.6 | 1.0 | 1.5 |
| Inter-layer Resistance ($\Omega$-cm²/sec) | | | | | | | | |
| Before Annealing Bent | 20 | 18 | 25 | 80 | 12 | 15 | 20 | 40 |
| After Annealing Flat | 6.2 | 5.8 | 5.9 | 7.2 | 5.1 | 5.3 | 5.7 | 6.5 |

TABLE 2-continued

Adhesion

| Before Annealing Bent | 10 | 10 | 10 | 15 | 10 | 10 | 10 | 15 |
|---|---|---|---|---|---|---|---|---|
| After Annealing Flat | no exfoliation | no exfoliation | no exfoliation | no exfoliation | no exfoliation | no exfoliation | no exfoliation | no exfoliation |
| Corrosion Resistance Rusting Ratio (%) | <20 | <20 | <20 | <10 | <20 | <20 | <20 | <10 |
| Weldability (cm/min) Max. speed with no blow-hole Generation | 60 | 80 | 50 | 30 | 80 | 70 | 60 | 40 |
| Punchability ($\times 10^4$ cycles) | >100 | >100 | >100 | >100 | >100 | >100 | >100 | >100 |
| Anti-refrigerant (weight change) | almost no change | almost no change | almost no change | almost no change | almost no change | almost no change | almost no change | almost no change |
| Anti-Oil (weight change) | almost no change | almost no change | almost no change | almost no change | almost no change | almost no change | almost no change | almost no change |
| Thermal Decomposition Peak Temperature (°C.) | 423 | 438 | 416 | 412 | 420 | 423 | 438 | 416 |

A description will now be given of Comparative Examples.

The following commercially available resins were used in these Comparative Examples.

R1: Aqueous solution of bisphenol type epoxy resin (solid resin content 40 wt%)

R2: Aqueous emulsion of vinylacetate resin (solid resin content 45 wt%)

R3: Aqueous solution of resol-type phenol resin (solid resin content 53 wt%)

R4: Aqueous solution of polyester resin (solid resin content 55 wt%)

R5: Aqueous emulsion of acrylic resin (solid resin content 47 wt%) Copolymer of 50 weight parts of methylacrylate and 30 weight parts of butylacrylate R6: Aqueous emulsion of styrene resin (solid resin content 46 wt%)

C. hot air oven for 120 seconds to form insulation films on the steel sheets. The deposition quantities of the films are shown in Table 4.

Table 4 shows that, in Comparative Examples 1 and 3, films failed to form due to gelation of the resin emulsion in the coating liquids.

Characteristics of Comparative Examples 2, 4, 5 and 6 were measured in the same way as in the Examples and evaluated on the same criteria as were the Examples, to obtain results as shown in Table 4.

It is clearly seen that the characteristics of the Comparative Examples shown in Table 4 are greatly inferior to those of the Examples of the invention shown in Table 2.

TABLE 3

|  | Comparative Ex. 1 | Comparative Ex. 2 | Comparative Ex. 3 | Comparative Ex. 4 | Comparative Ex. 5 | Comparative Ex. 6 | Comparative Ex. 7 | Comparative Ex. 8 |
|---|---|---|---|---|---|---|---|---|
| Kind of Emulsion | R 1 | R 2 | R 3 | R 4 | R 5 | R 6 | E 1 | E 1 |
| Amount of Emulsion* | 20 weight Parts | 25 weight Parts | 20 weight Parts | 30 weight Parts | 15 weight Parts | 27 weight Parts | 25 weight Parts | 25 weight Parts |
| Kind and Amount of Phosphate | Monobasic Magnesium Phosphate 100 Weight Parts Calculated on $H_3PO_4$ basis | Monobasic Calcium Phosphate 100 Weight Parts Calculated on $H_3PO_4$ basis | Monobasic Aluminum Phosphate 100 Weight Parts Calculated on $H_3PO_4$ basis | Monobasic zinc Phosphate 100 Weight Parts Calculated on $H_3PO_4$ basis | Monobasic Manganese Phosphate 100 Weight Parts Calculated on $H_3PO_4$ basis | Monobasic Molybdenum Phosphate 100 Weight Parts Calculated on $H_3PO_4$ basis | Monobasic Magnesium Phosphate 100 Weight Parts Calculated on $H_3PO_4$ basis | Monobasic Magnesium Phosphate 100 Weight Parts Calculated on $H_3PO_4$ basis |
| Kind and Amount of Accelerator** | Sodium Alkylbenzene Sulfonate 5 Weight Parts | Polyoxyethylene Polyoxypropylene Block Polymer 1 Weight Parts | Aluminum Nitrate 2 Weight Parts | Sodium Alkybenzene Sulfonate 1 Weight Parts | Sodium Alkylbenzene Sulfonate 5 Weight Parts | Sodium Alkylbenzene Sulfonate 2 Weight Parts | Nitric Acid 10 Weight Parts | Nitric Acid 10 Weight Parts |
| Kind and Amount of Additive*** | Colloidal Silica: 20 Weight Parts | Boric Acid: 15 Weight Parts | Colloidal Aluminum: 25 Weight Parts | Zirconia Sol: 18 Weight Parts | Boric Acid: 12 Weight Parts | Calcium Phosphate: 20 Weight Parts |  |  |

*Calculated on resin solid content per 100 weight parts of $H_3PO_4$
**per 100 weight parts of $H_3PO_4$
***Calculated on solid content per 100 weight parts of $H_3PO_4$ As in the case of Examples described before, treating liquids of various compositions shown in Table 3 were applied to surfaces of 0.5 mm thick electromagnetic steel sheets. The steel sheets were then baked at 120° C. in a 450°

TABLE 4

| | Comparative Ex. 1 | Comparative Ex. 2 | Comparative Ex. 3 | Comparative Ex. 4 | Comparative Ex. 5 | Comparative Ex. 6 | Comparative Ex. 7 | Comparative Ex. 8 |
|---|---|---|---|---|---|---|---|---|
| Coating Liquid Stability | × (Gelated) | o | × (Gelated) | o | o | o | o | o |
| Amount of Coating Film Deposition (g/m$^2$) | Sound Film not formed | 1.0 | Sound Film not formed | 0.8 | 1.8 | 0.8 | 4.5 | 0.1 |
| Inter-layer Resistance ($\Omega$-cm$^2$/sec) | | | | | | | | |
| Before Annealing Bent | | 21 | | 16 | 27 | 8 | >200 | 4 |
| After Annealing Flat | | 0.8 | | 0.6 | 0.9 | 0.7 | 10.6 | 1.2 |
| Adhesion | | | | | | | | |
| Before Annealing Bent | | 20 | | 20 | 20 | 20 | 20 | 20 |
| After Annealing Flat | | Exfoliation | | exfoliation | exfoliation | exfoliation | exfoliation | exfoliation |
| Corrosion Resistance Rusting Ratio (%) | | 70 | | 80 | 60 | 20 | <5 | 30 |
| Weldability (cm/min) Max. speed with no blowhole Generation | | 40 | | 30 | 10 | 40 | 10 | 140 |
| Punchability (×10$^4$ cycles) | | >100 | | >100 | >100 | 100 | >100 | 40 |
| Anti-refrigerant (weight change) | | almost no change | | slight change | almost no change | almost no change | almost no change | almost no change |
| Anti-Oil (weight change) | | almost no change | | slight change | almost no change | almost no change | almost no change | almost no change |
| Thermal Decomposition Peak Temperature (°C.) | | 360 | | 345 | 390 | 395 | 423 | 423 |

As the foregoing description indicates, the invention provides electromagnetic steel sheet having electrically insulating film exhibits high resistance to corrosion, as well as demonstrating excellent electrical insulation, adhesion, punching characteristics and slipperiness. In addition, undesirable environmental effects are avoided through the use of phosphate ion aqueous solution.

Similarly, cores capable of being used in motors and transformers produced in accordance with the invention exhibit superior resistance to corrosion.

What is claimed is:

1. An electromagnetic steel sheet having a corrosion-resistant electrically insulating film not containing chromate as its primary component formed thereon, said film comprising an emulsion of fine resin particles, a reducing agent and an accelerator;

said emulsion having a weight change peak temperature of about 400° C. or more, as measured by differential thermal weight measurement conducted while increasing the emulsion temperature at a constant rate, said emulsion also having substantial resistance to gelling when contacted by phosphoric acid; and said reducing agent comprising an aqueous solution containing the phosphate ion, said reducing agent having at least one metal dissolved therein.

2. An electromagnetic steel sheet according to claim 1, wherein said emulsion further comprises crosslinkable thermosetting resin.

3. An electromagnetic steel sheet according to claim 2 wherein said emulsion further comprises an outer resin layer resistant to phosphoric acid.

4. An electromagnetic steel sheet according to claim 3 wherein said thermosetting resin further comprises a nitrogen atom in its principal skeleton.

5. An electromagnetic steel sheet according to claim 1, wherein the amount of said electrically insulating film deposited on said steel sheet ranges from about 0.2 to about 4.0 g/m$^2$.

6. An electromagnetic steel sheet according to claim 2, wherein the amount of said electrically insulating film deposited on said steel sheet ranges from about 0.2 to about 4.0 g/m$^2$.

7. An electromagnetic steel sheet according to claim 3, wherein the amount of said electrically insulating film deposited on said steel sheet ranges from about 0.2 to about 4.0 g/m$^2$.

8. An electromagnetic steel sheet according to claim 4, wherein the amount of said electrically insulating film deposited on said steel sheet ranges from about 0.2 to about 4.0 g/m$^2$.

9. A corrosion-resistant core capable of being used in a motor or transformer, comprising a plurality of laminated core sheets made from electromagnetic steel sheet according to claim 1.

10. A corrosion-resistant core capable of being used in a motor or transformer, comprising a plurality of laminated core sheets made from electromagnetic steel sheet according to claim 2.

11. A corrosion-resistant core capable of being used in a motor or transformer, comprising a plurality of laminated core sheets made from electromagnetic steel sheet according to claim 3.

12. A corrosion-resistant core capable of being used in a motor or transformer, comprising a plurality of laminated core sheets made from electromagnetic steel sheet according to claim 4.

13. An electromagnetic steel sheet coated with a corrosion-resistant electrically insulating film not containing chromate as its primary component comprising:

1) an emulsion of free resin particles, said emulsion having a weight change peak temperature of about 400° C. or more, as measured by differential thermal weight measurement conducted while increasing the emulsion temperature at a constant rate, said emulsion also having substantial resistance to gelling when contacted by phosphoric acid;

2) a reducing agent including an aqueous solution containing a phosphate ion and having at least one metal dissolved therein; and 3) an accelerator.

14. The steel sheet according to claim 13, wherein said fine resin particles include an inner core formed from a crosslinkable thermosetting resin and an outer shell formed from a resin resistant to phosphoric acid.

15. The steel sheet according to claim 14, wherein said crosslinkable thermosetting resin is selected from the group consisting of phenol resins, epoxy resins, furfural resins, urethane resins, unsaturated polyester resins, amino resins, polyimide resins and polyamideimide resins.

16. The steel sheet according to claim 14, wherein said resin resistant to phosphoric acid is a resin formed from an ethylenic unsaturated carboxylic acid and a monomer copolymerizable therewith.

17. The steel sheet according to claim 16, wherein said ethylenic unsaturated carboxylic acid is selected from the group consisting of ethylenic unsaturated monobasic carboxylic acids and unsaturated dibasic carboxylic acids, and said copolymerizable monomer is selected from at least one of the group consisting of alkyl acrylates, methacrylates, styrene, α-methylstyrene, vinyl toluene, t-butyl styrene, ethylene, propylene, vinyl acetate, vinyl chloride, vinyl propionate, acrylonitrile, methacrylonitrile, (metha) dimethylaminoethyl acrylate, vinyl pyridine and acrylamide.

18. The steel sheet according to claim 13, wherein said phosphate ion is a phosphate salt selected from the group consisting of sodium phosphate, potassium phosphate, magnesium phosphate, calcium phosphate, manganese phosphate, molybdenum phosphate, zinc phosphate and aluminum phosphate.

19. The steel sheet according to claim 13, wherein said metal is selected from the group consisting of metal oxides, metal hydroxides and metal carbonates.

20. The steel sheet according to claim 13, wherein said accelerator is selected from the group consisting of sodium alkylbenzene sulfonic acid, polyoxyethylene, polyoxypropylene block polymer, polyoxyethylene phenol ether, aluminum acetate, acetic acid, heteromolybdic acid, potassium permanganate and metallic oxide agents.

* * * * *